(12) United States Patent
Takei

(10) Patent No.: US 9,469,333 B2
(45) Date of Patent: Oct. 18, 2016

(54) RACK AND PINION MECHANISM
(71) Applicant: Showa Corporation, Gyoda-shi (JP)
(72) Inventor: Ryosuke Takei, Haga-gun (JP)
(73) Assignee: SHOWA CORPORATION, Gyoda-Shi (JP)
( * ) Notice: Subject to any disclaimer, the term of this patent is extended or adjusted under 35 U.S.C. 154(b) by 0 days.
(21) Appl. No.: 14/866,189
(22) Filed: Sep. 25, 2015

(65) Prior Publication Data
US 2016/0229443 A1 Aug. 11, 2016

(30) Foreign Application Priority Data
Feb. 5, 2015 (JP) ................... 2012-021667

(51) Int. Cl.
B62D 3/12 (2006.01)
F16H 19/04 (2006.01)
F16H 55/28 (2006.01)
(52) U.S. Cl.
CPC .............. B62D 3/126 (2013.01); F16H 19/04 (2013.01); F16H 55/28 (2013.01); F16H 2019/046 (2013.01); F16H 2055/281 (2013.01)
(58) Field of Classification Search
CPC ......... B62D 3/126; B62D 5/22; F16H 19/04; F16H 2019/046; F16H 55/28; F16H 2055/281
USPC ....... 74/30, 842, 422, 46, 87.17, 89.11, 109, 74/409
See application file for complete search history.

(56) References Cited

U.S. PATENT DOCUMENTS 8,327,731 B2 * 12/2012 Sung ...................... B62D 3/123 74/388 PS
2007/0209463 A1 9/2007 Song et al.
2011/0303028 A1 * 12/2011 Yu ........................... B62D 3/123 74/30
2014/0020492 A1 * 1/2014 Fujita ..................... B62D 3/123 74/422
2014/0260719 A1 * 9/2014 Bae ........................ B62D 3/123 74/30
2015/0226315 A1 * 8/2015 Iizuka ................... B62D 3/126 74/409

FOREIGN PATENT DOCUMENTS

JP        2002-240723 A    8/2002
KR        102130008964     10/2014
WO        WO-2014/163029 A 10/2014

OTHER PUBLICATIONS

U.K Search Report mailed Mar. 17, 2016 for the corresponding U.K Patent Application No. GB1517123.4.

* cited by examiner

Primary Examiner — Terence Boes
Assistant Examiner — Bobby Rushing, Jr.
(74) Attorney, Agent, or Firm — Leason Ellis LLP

(57) ABSTRACT

A rack and pinion mechanism includes: a pinion shaft at which pinion teeth are formed; a rack shaft at which rack teeth to be engaged with the pinion teeth are formed; a pressing portion arranged at a side of the rack shaft opposite to a side of the rack shaft at which the rack teeth are formed and pressing the rack shaft toward the pinion shaft; a first elastic body biasing the pressing portion in a direction approaching the pinion shaft by an elastic restoring force; and a second elastic body biasing the pressing portion in a direction away from the pinion shaft by an elastic restoring force, and a first biasing force with which the first elastic body biases the pressing portion is larger than a second biasing force with which the second elastic body biases the pressing portion in an initial state.

8 Claims, 5 Drawing Sheets

RACK AND PINION MECHANISM

CROSS-REFERENCE TO RELATED APPLICATIONS

This application claims the benefit of Japanese Patent Application JP 2015-021667, filed Feb. 5, 2015, the entire content of which is hereby incorporated by reference, the same as if set forth at length.

BACKGROUND OF THE INVENTION

1. Field of the Invention

The present invention relates to a rack and pinion mechanism.

2. Description of Related Art

A steering apparatus for a vehicle has a rack and pinion mechanism which converts a rotational force of a steering wheel into a reciprocating motion in a vehicle width direction. The rack and pinion mechanism includes a pinion shaft in which an operating force (rotational force) is inputted and which has pinion teeth and a rack shaft having rack teeth to be engaged with the pinion teeth.

The rack and pinion mechanism also includes a rack guide (pressing portion) slidingly contacting the rack shaft and pressing the rack shaft toward the pinion shaft, and a compressed coil spring biasing the rack guide toward the rack shaft by an elastic restoring force for preventing backlash between the pinion shaft and rack shaft (refer to JP-A-2002-240723 (Patent Document 1). That is, the rack guide constantly presses the rack shaft toward the pinion shaft by the elastic restoring force of the compressed coil spring. Namely, the rack guide presses the rack shaft to the pinion shaft also when the rack shaft is engaged with the pinion shaft in good condition and a center distance between the shafts is suitable.

SUMMARY OF THE INVENTION

When there is a danger that a large separating force of separating the rack shaft from the pinion shaft is acted on the rack shaft from the outside, for example, a structure in which a wire rod of the compressed coil spring is made to be thick to thereby increase the elastic restoring force of the compressed coil spring can be considered for pressing the rack shaft to the pinion shaft against the large separating force.

However, when the elastic restoring force is increased as described above, the pressing force from the rack guide to the rack shaft in a normal state (initial state) is also increased, as a result, it becomes difficult that the rack shaft moves in the vehicle width direction and friction is also increased. There is thus a danger that steering feeling of the steering wheel is deteriorated.

In view of the above, the present invention has been made to provide a rack and pinion mechanism in which the pressing force for pressing the rack shaft to the pinion shaft is increased only when the large separating force of separating the rack shaft from the pinion shaft is acted on the rack shaft so as not to deteriorate the steering feeling in a normal state.

According to an embodiment of the present invention, there is provided a rack and pinion mechanism including a pinion shaft at which pinion teeth are formed, a rack shaft at which rack teeth to be engaged with the pinion teeth are formed, a pressing portion arranged at a side of the rack shaft opposite to a side of the rack shaft at which the rack teeth are formed and pressing the rack shaft toward the pinion shaft, a first elastic body biasing the pressing portion in a direction approaching the pinion shaft by an elastic restoring force and a second elastic body biasing the pressing portion in a direction away from the pinion shaft by an elastic restoring force, in which a first biasing force with which the first elastic body biases the pressing portion is larger than a second biasing force with which the second elastic body biases the pressing portion in an initial state.

According to the above structure, the first biasing force is larger than the second biasing force in the initial state, therefore, a differential biasing force of the first biasing force and the second biasing force is acted on the pressing portion. The pressing portion presses the rack shaft toward the pinion shaft with the differential biasing force. As the rack shaft is pressed toward the pinion shaft with the differential force as described above, the mobility of the rack shaft and the rotationality of the pinion shaft, namely, steering feeling is not deteriorated in a normal state.

When a large separating force of separating the rack shaft from the pinion shaft is acted on the rack shaft, and the rack shaft and the pressing portion move in a direction away from the pinion shaft (front side in a later-described embodiment), the first biasing force is increased as the first elastic body is contracted, and the second biasing force is reduced as the second elastic body comes close to the natural length. Accordingly, the differential biasing force (first biasing force-second biasing force) in the side directed to the rack shaft which is acted on the pressing portion is increased. Accordingly, the pressing force with which the pressing portion presses the rack shaft to the pinion shaft is increased. Even when the large separating force of separating the rack shaft from the pinion shaft is acted on the rack shaft, the rack shaft is pressed and returned to the pinion shaft with the large pressing force, therefore, backlash hardly occurs It is also preferable to apply a structure of further including a receiving portion arranged so as to face the pressing portion with the rack shaft interposed therebetween and integrally formed with the pressing portion, which receives the second biasing force of the second elastic body.

According to the structure, the second biasing force of the second elastic body can be received by the receiving portion arranged so as to face the pressing portion with the rack shaft interposed therebetween.

It is also preferable to apply a structure in which the second elastic body is restored to a natural length when the rack shaft is separated from the pinion shaft by an external force.

According to the above structure, the second biasing force of the second elastic body becomes "0 (zero)" when the second elastic body is restored to the natural length. Accordingly, the first biasing force of the first elastic body is not reduced by the second biasing force of the second elastic body and is acted on the pressing force as it is.

It is further preferable to apply a structure in which a first spring rate of the first elastic body is higher than a second spring rate of the second elastic body.

According to the present invention, it is possible to provide a rack and pinion mechanism in which a pressing force of pressing the rack shaft to the pinion shaft is increased only when a large separating force of separating the rack shaft from the pinion shaft is acted on the rack shaft so as not to deteriorate steering feeling in a normal state.

DESCRIPTION OF EMBODIMENTS

Figure 1:
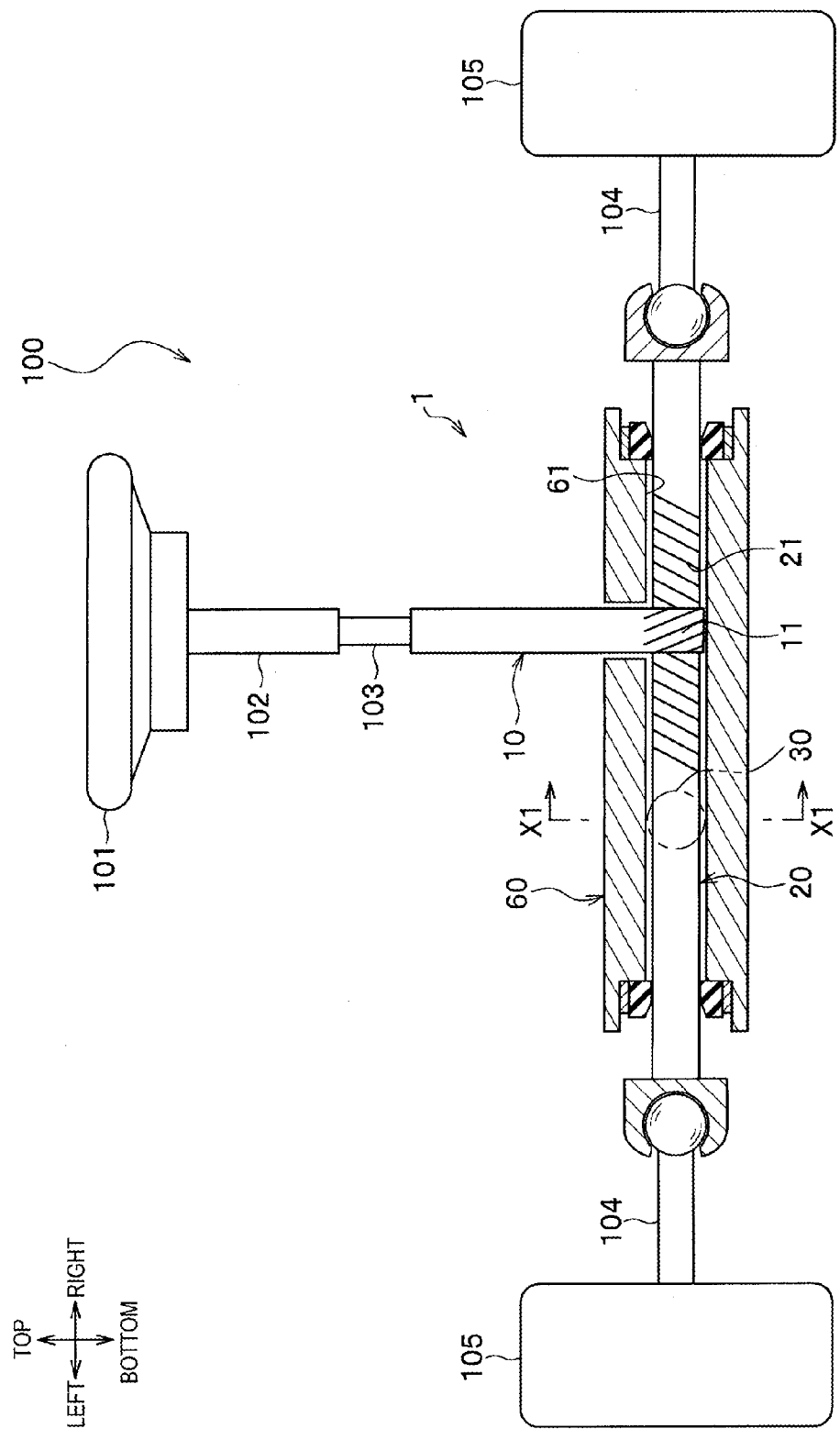
FIG. 1 is a view showing a structure of a steering apparatus according to an embodiment.

An embodiment of the present invention will be explained with reference to FIG. 1 to FIG. 4.
(Structure of Steering Apparatus)

A steering apparatus 100 is a rack and pinion-type motor-driven power steering apparatus, which belongs a pinion assist type in which an assist force generated by an electric motor is inputted to a pinion shaft 10. A column assist type or a rack assist type may be applied. Additionally, a hydraulic power steering apparatus which generates the assist force by a hydraulic motor and a manual steering apparatus not having the electric motor may also be applied.

The steering apparatus 100 includes a steering wheel 101 operated by a driver, a steering shaft 102 rotating integrally with the steering wheel 101, a torsion bar 103 connected to a lower end of the steering shaft 102, the pinion shaft 10 and a rack shaft 20 extending in a right and left direction (vehicle width direction).
(Structure of Rack and Pinion Mechanism)

The steering apparatus 100 includes a rack and pinion mechanism 1 which converts a rotational motion from the steering wheel 101 into a reciprocating motion in the right and left direction. The rack and pinion mechanism 1 includes the pinion shaft 10, the rack shaft 20, a rack guide 30, a first compression coil spring 51 (first elastic body), a second compression coil spring 52 (second elastic body) and a housing 60.
(Pinion Shaft)

The pinion shaft 10 is a round bar-shaped member extending almost in a vertical direction, an upper end of which is connected to the torsion bar 103. Pinion teeth 11 are formed in a lower end of the pinion shaft 10. The pinion shaft 10 is supported by the housing 60 rotatably around an axis O1 through a bearing (not shown).

Moreover, a worm wheel (not shown) is coaxially fixed to the pinion shaft 10. The assist force is inputted to the worm wheel (not shown) from the electric motor (not shown) so as to correspond to a torsional torque generated by the torsion bar 103.
(Rack Shaft)

The rack shaft 20 is a bar-shaped member extending in the right and left direction, which is slidably housed in the housing 60 through a cylindrical bush (not shown). Respective end portions of the rack shaft 20 are connected to front wheels 105 (steered wheels) through tie rods 104.

When the rack shaft 20 moves along an axis O2 extending in the right and left direction, a steering angle of the front wheels 105 is changed to thereby turn the front wheels 105. Rack teeth 21 to be engaged with the pinion teeth 11 are formed in the rack shaft 20. The embodiment cites a structure in which teeth tips of the rack teeth 21 face backward and the rack shaft 20 is engaged with the front side of the pinion shaft 10. However, a structure in which teeth tips of the rack teeth 21 face forward and the rack shaft 20 is engaged with the rear side of the pinion shaft 10 may be also applied.

Here, for example, when the front wheel 105 collides with a curbstone or when the steering wheel is suddenly operated, a separating force of separating from the pinion shaft 10 is acted on the rack shaft 20.
(Rack Guide)

The rack guide 30 is a member with a cylindrical outline extending in the front and rear direction, which is the member pressing the rack shaft 20 toward the pinion shaft 10 and guiding the rack shaft 20 in the right and left direction for preventing backlash between the pinion shaft 10 and the rack shaft 20. The rack guide 30 is arranged at a position different from the pinion shaft 10 in the right and left direction (vehicle width direction, an axial direction of the rack shaft 20) (see FIG. 1).

The rack guide 30 includes a rack guide body 31 arranged in the front side of the rack shaft, a receiving portion 32 arranged in the rear side of the rack shaft 20 and two connecting portions 33. That is, in the rack guide 30 having the cylindrical outline, an insertion hole 34 extending in the vehicle width direction, into which the rack shaft 20 is inserted is formed in the almost middle part in the front and rear direction. Here, the opposite side of the rack teeth 21 is the front side.

Note that the structure in which the rack guide body 31, the receiving portion 32 and the connecting portions 33 are integrally formed is cited as an example in this case. However, a structure in which the rack guide body 31 and the receiving portion 32 are formed by different members and integrated by being connected by two connecting members can be also applied.
(Rack Guide Body)

The rack guide body 31 is a portion arranged in the front side of the rack shaft 20 and receiving a backward first biasing force F51 of the first compressed coil spring 51. The rack guide body 31 is a pressing portion which guides the rack shaft 20 while pressing the rack shaft 20 toward the pinion shaft 10. That is, the rack guide body 31 is arranged on the side opposite to the rack teeth 21 in the front and rear direction.

A rear side of the rack guide 31 is cut in a semicircular shape in a side-cross sectional view (cross-sectional view in the right and left direction), and a sliding surface 31a having a semi-arc shape is formed. The sliding surface 31a is a guide surface making sliding contact with on the front surface of the rack shaft 20 to guide the rack shaft 20. As the rack shaft 20 slidingly contacts the half arc-shaped sliding surface 31a as described above, the rack shaft 20 is smoothly guided without moving vertically. A resin layer 31b for reducing friction with respect to the rack shaft 20 is formed in the sliding surface 31a.

Two O-rings 41 and 41 are attached to an outer peripheral surface of the rack guide body 31. The two O-rings 41 and 41 are arranged in two steps in the front and rear direction to thereby seal between the rack body 31 and the housing 60.
(Receiving Portion)

The receiving portion 32 is a portion receiving a forward biasing force of the second compressed coil spring 52, which is arranged in the rear side of the rack shaft 20, namely, on the rack teeth 21 side. That is, the receiving portion 32 is arranged so as to face the rack guide body 31 with the rack shaft 20 interposed therebetween in the front and rear direction. The receiving portion 32 is integrally formed with the rack guide body 31 as described later, and a forward second biasing force F52 of the second compressed coil spring 52 is transmitted to the rack guide body 31 through the receiving portion 32 and the connecting portions 33.

Two O-rings 42 and 42 are attached to an outer peripheral surface of the receiving portion 32. The two O-rings 42 and 42 are arranged in two steps in the front and rear direction to thereby seal between the receiving portion 32 and the housing 60.

(Connecting Portion)

The two connecting portions 33 and 33 are portions connecting the rack guide body 31 and the receiving portion 32 in the front and rear direction. Accordingly, the rack guide body 31 and the receiving portion 32 are integrally moved in the front and rear direction.

(First Compressed Coil Spring)

The first compressed coil spring 51 is a first elastic body which is arranged so as to extend in the front and rear direction inside the housing 60 and which biases the rack guide body 31 to the rear side (side approaching the pinion shaft 10) by an elastic restoring force thereof. The first compressed coil spring 51 is provided in a contracted manner between the rack guide body 31 and a first cap 63 which is screwed to the housing 60. A portion between the first cap 63 and the housing 60 is sealed by an O-ring 63a.

(Second Compressed Coil Spring)

The second compressed coil spring 52 is a second elastic body which is arranged so as to extend in the front and rear direction inside the housing 60 and which biases the receiving portion 32 (rack guide body 31) to the front side (side going away from the pinion shaft 10) by the elastic restoring force. The second compressed coil spring 52 is provided in a contracted manner between the receiving portion 32 and a second cap 64 which is screwed to the housing 60. A portion between the second cap 64 and the housing 60 is sealed by an O-ring 64a.

(Biasing Forces of First Compressed Coil Spring and Second Compressed Coil Spring)

In an initial state (normal state), the first biasing force F51 with which the first compressed coil spring 51 biases the rack guide body 31 in the rear direction in an initial state (normal state) is larger than the second biasing force F52 with which the second compressed coil spring 52 biases the receiving portion 52 in the front direction (F51>F52).

Here, the initial state means a neutral state of the pinion shaft 10 (steering wheel 101), which is a state where an external force is not inputted to the rack shaft 20 (set state). The first biasing force F51 is given by a product of a first spring rate K51 (spring constant) of the first compressed coil spring 51 and a contracted length L51 from a natural length of the first compressed coil spring 51 (F51=K51×L51). The second biasing force F52 is given by a product of a second spring rate K52 (spring constant) of the second compressed coil spring 52 and a contracted length L52 from a natural length of the second compressed coil spring 52 (F52=K52× L52).

As the first biasing force F51 is larger than the second biasing force F52 as described above, the rack guide 30 presses the rack shaft 20 to the pinion shaft 10 with a differential biasing force F30 (F30=F51−F52). Accordingly, the rack teeth 21 of the rack shaft 20 are engaged with the pinion teeth 11 of the pinion shaft 10 in good condition to thereby prevent backlash.

(Natural Length of Second Compressed Coil Spring)

Figure 4:
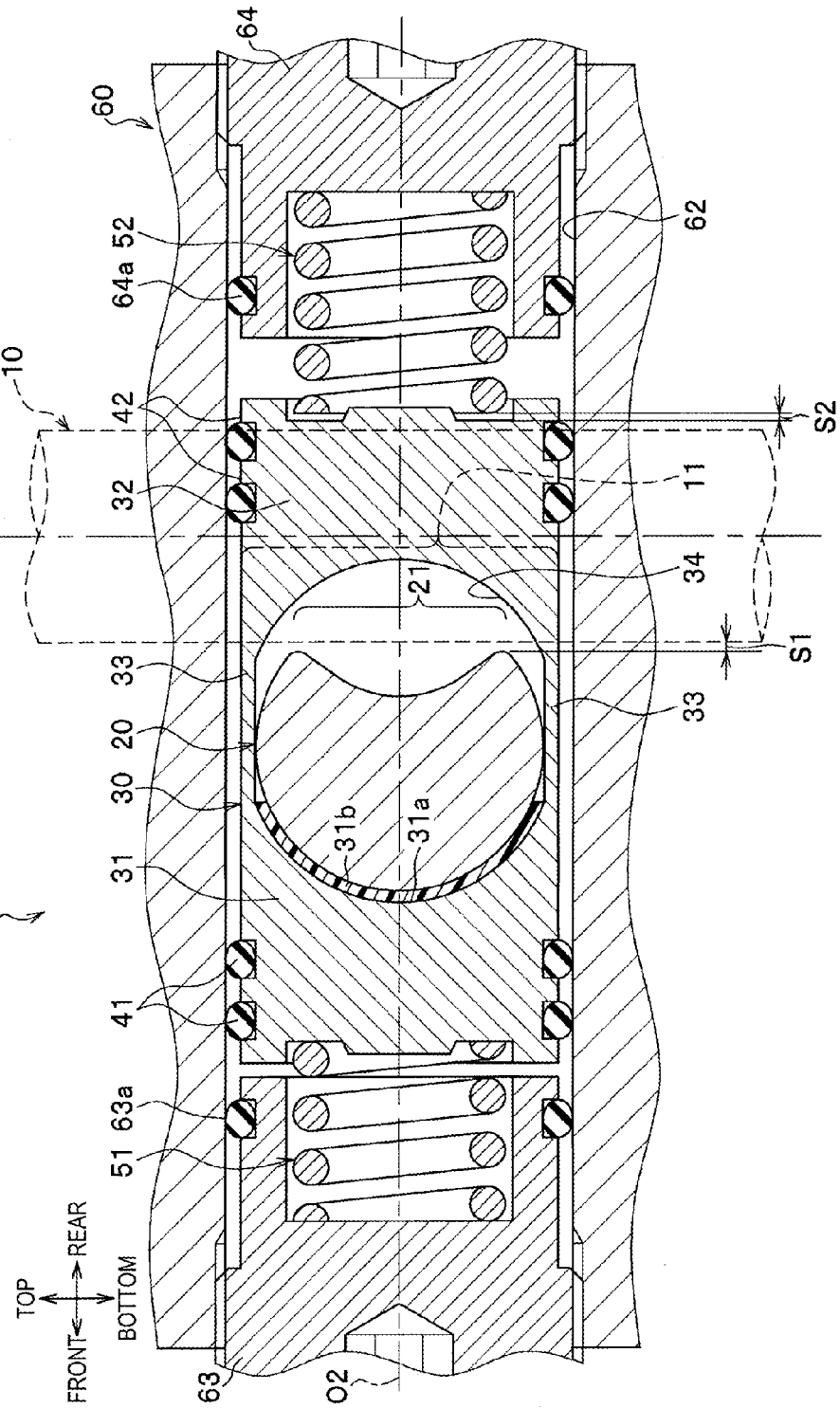
FIG. 4 is a cross-sectional view of the rack and pinion mechanism according to the embodiment, which shows a state in which a rack guide moves in a front direction.

As shown in FIG. 4, the second compressed coil spring 52 is configured to be restored to the natural length (free length) when the rack shaft 20 moves forward, for example, by a forward external force to separate from the pinion shaft 10 and a space S1 between the rack teeth 21 and the pinion teeth 11 is increased while maintaining the engaged state. The natural length is a spring length in the case where a compressive load or a tensile load is not acted. When the rack guide further moves forward, a space S2 is formed between the second compressed coil spring 52 and the receiving portion 32.

As the second compressed coil spring 52 returns to the natural length as described above, the forward second biasing force F52 becomes "0 (zero)", and the backward first biasing force F51 is acted on the rack guide 30 as it is. That is, the first biasing force F51 is not reduced by the second biasing force F52, and the large first biasing force F51 is acted on the rack guide 30, therefore, the rack guide 30 presses the rack shaft 20 toward the pinion shaft 10 with the large first biasing force F51 in the rear direction, and the rack shaft 20 is returned to the rear side immediately.

(Spring Rates of First Compressed Coil Spring and Second Compressed Coil Spring)

The first spring rate K51 of the first compressed coil spring 51 is higher than the second spring rate K52 of the second compressed coil spring 52 (K51>k52). The first spring rate K51 of the first compressed coil spring 51 is appropriately adjusted by changing the thickness and the material of a wire rod forming the first compressed coil spring 51. The same applies to the second spring rate K52 of the second compressed coil spring 52. Accordingly, when the rack guide 30 moves forward, the larger backward first biasing force F51 is generated and the rack guide 30 presses the rack shaft 20 to the pinion shaft 10 with the larger first biasing force F51.

(Housing)

The housing 60 is a casing which houses the lower end portion of the pinion shaft 10, the rack shaft 20 and the rack guide 30. The housing 60 is fixed to the vehicle body through a mount (not shown) and so on. A first through hole 61 piercing in the right and left direction is formed in the housing 60 (see FIG. 1). The first through hole 61 is a hole into which the rack shaft 20 is inserted.

Figure 2:
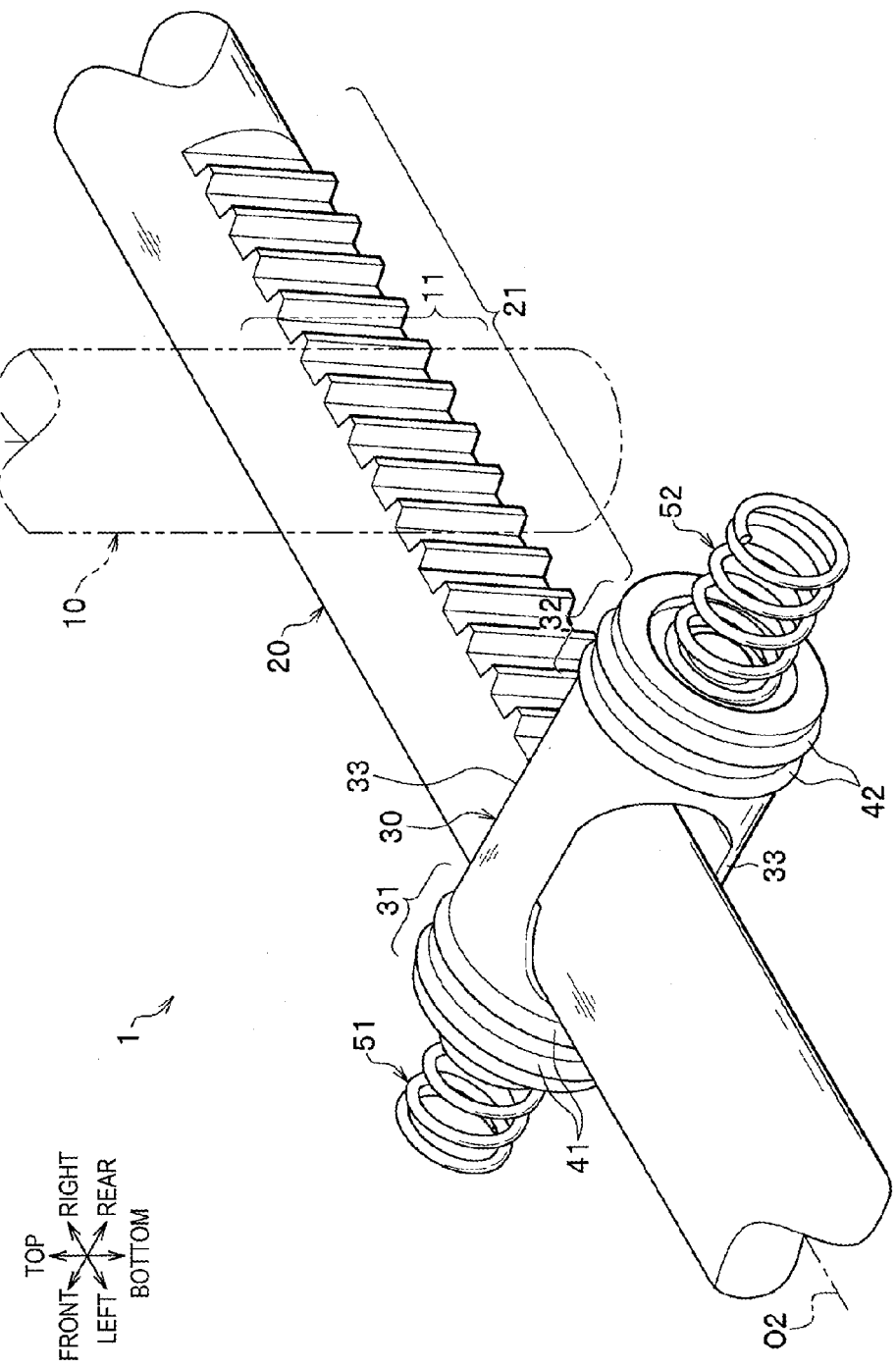
FIG. 2 is a perspective view of a rack and pinion mechanism according to the embodiment.
Figure 3:
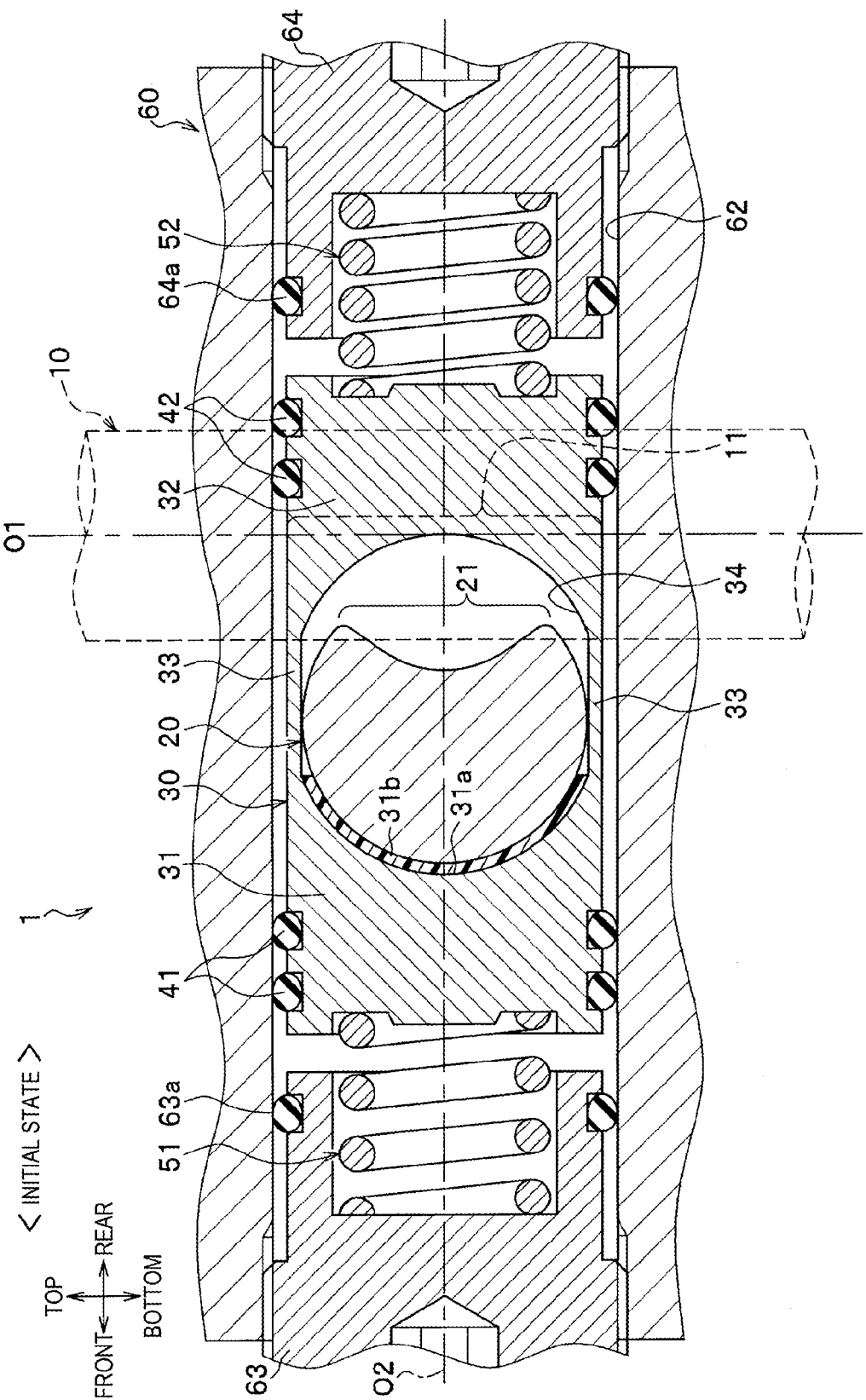
FIG. 3 is a cross-sectional view of the rack and pinion mechanism according to the embodiment, which shows an initial state.

A second through hole 62 piercing in the front and rear direction is also formed in the housing 60 (see FIG. 2). The second through hole 62 is a hole into which the rack guide 30 is inserted, which is a hole guiding the rack guide 30 in the front and rear direction.

(Operation and Effect of Rack and Pinion Mechanism)

According to the rack and pinion mechanism 1 having the above structure, the following operation and effect can be obtained.

As the first biasing force F51 is larger than the second biasing force F52 in the initial state, the differential biasing force F30 (F30=F51-F52) which is directed to the rack shaft 20 and is a difference between the first biasing force F51 and the second biasing force F52 is acted on the rack guide 30. The rack guide 30 presses the rack shaft 20 toward the pinion shaft 10 with the differential biasing force F30. Accordingly, the mobility of the rack shaft 20 and the rotationality of the pinion shaft 10 are not reduced, therefore, steering feeling is not deteriorated in a normal state.

On the other hand, when the separating force of separating the rack shaft 20 from the pinion shaft 10 is acted on the rack shaft 20, for example, from the outside, and when the rack shaft 20 and the rack guide 30 move in the front direction away from the pinion shaft 10, the first biasing force F51 is increased as the first compressed coil spring 51 is contracted, and the second biasing force F52 is reduced as the second compressed coil spring 52 comes close to the natural length.

Accordingly, the backward differential biasing force F30 (F30=F51−F52) which is directed to the rack shaft 20 to be acted on the rack guide 30 is increased. Therefore, the pressing force of pressing the rack shaft 20 to the pinion shaft 10 is increased. Accordingly, the rack shaft 20 is pressed to the pinion shaft 10 and backlash hardly occurs.

Modification Example

One embodiment of the present invention has been explained as the above, and the present invention is not limited to this and may be altered, for example, as described below.

The structure in which the present invention is applied to the steering apparatus 100 having one pinion shaft 10 to which the assist force is inputted has been cited the an example. In addition to the example, in a structure in which a pinion shaft which is different from the pinion shaft 10 to which the assist force is inputted is provided, the present invention can be applied to a portion where another pinion shaft is engaged with the rack shaft 20. That is, the present invention can be applied to a dual-pinion type steering apparatus 100.

Although the structure in which the first elastic body and the second elastic body are formed of the compressed coil springs has been cited as the example in the above embodiment, a structure in which the elastic bodies are formed of disc springs can be also applied. It is further preferable to apply a structure in which the first elastic body and the second elastic body are formed of rubber bodies made of rubber, and the biasing force can be appropriately changed by changing the material, the length in the axial direction, the diameter and so on of the rubber bodies in the case of this structure.

Figure 5:
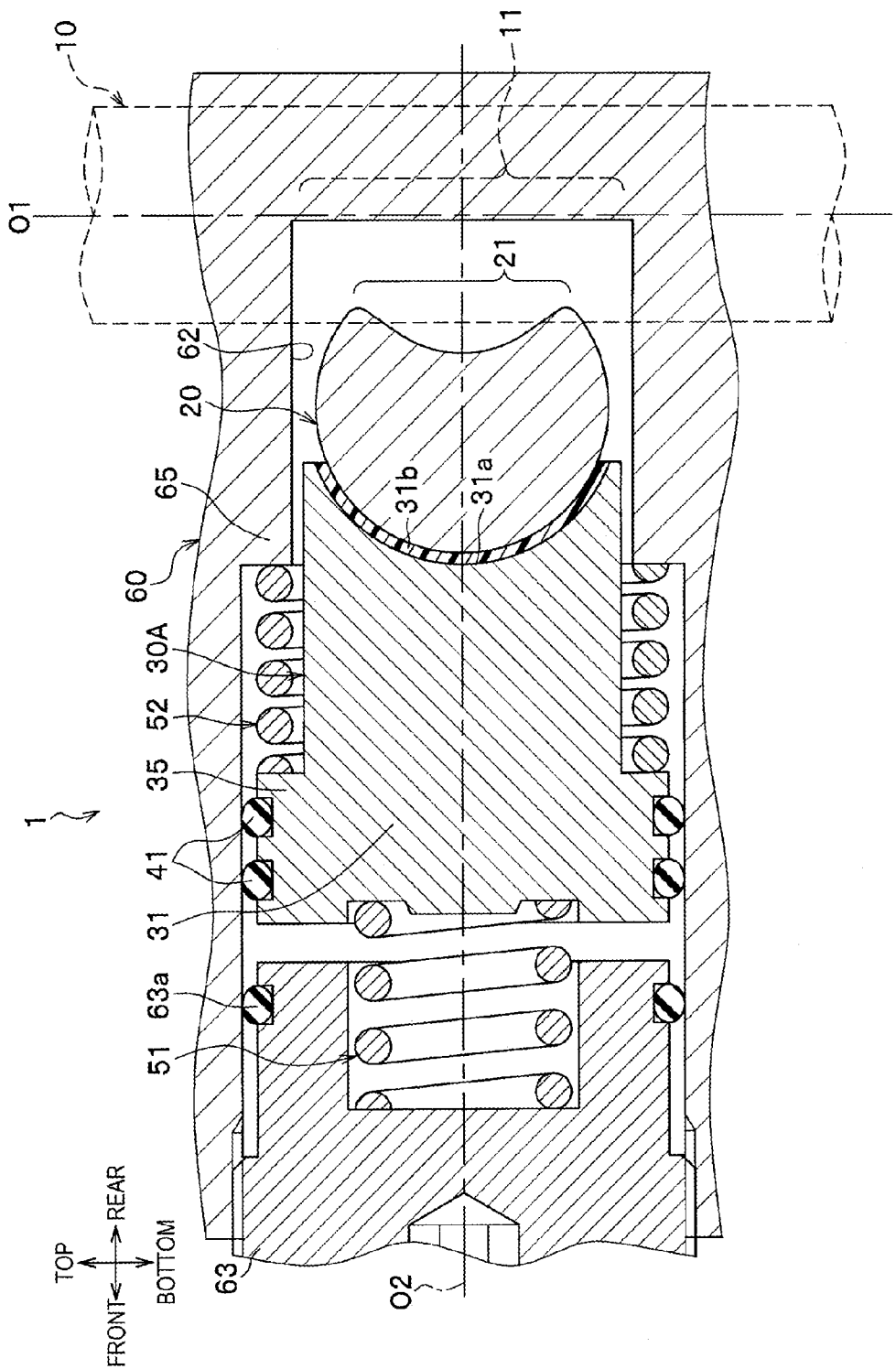
FIG. 5 is a cross-sectional view of a rack and pinion mechanism according to a modification example, which shows an initial state.

It is further preferable to apply a structure as shown in FIG. 5. That is, the second compressed coil spring 52 is arranged on the front side of the rack shaft 20, which is the same side as the first compressed coil spring 51. The second compressed coil spring 52 is provided in a contracted manner between a shoulder portion 35 formed to be partially large diameter in the rack guide body 31 and a protruding wall portion 65 protruding inward in a radial direction inside an inner peripheral surface of the second through hole 62.

What is claimed is:

1. A rack and pinion mechanism comprising:
   a pinion shaft at which pinion teeth are formed;
   a rack shaft at which rack teeth to be engaged with the pinion teeth are formed;
   a pressing portion arranged at a side of the rack shaft opposite to a side of the rack shaft at which the rack teeth are formed and pressing the rack shaft toward the pinion shaft;
   a first elastic body biasing the pressing portion in a direction approaching the pinion shaft by an elastic restoring force; and
   a second elastic body biasing the pressing portion in a direction away from the pinion shaft by an elastic restoring force,
   wherein a first biasing force with which the first elastic body biases the pressing portion is larger than a second biasing force with which the second elastic body biases the pressing portion in an initial state.

2. The rack and pinion mechanism according to claim 1, further comprising:
   a receiving portion arranged so as to face the pressing portion with the rack shaft interposed therebetween and integrally formed with the pressing portion, which receives the second biasing force of the second elastic body.

3. The rack and pinion mechanism according to claim 1, wherein the second elastic body is restored to a natural length when the rack shaft is separated from the pinion shaft by an external force.

4. The rack and pinion mechanism according to claim 2, wherein the second elastic body is restored to a natural length when the rack shaft is separated from the pinion shaft by an external force.

5. The rack and pinion mechanism according claim 1, wherein a first spring rate of the first elastic body is higher than a second spring rate of the second elastic body.

6. The rack and pinion mechanism according claim 2, wherein a first spring rate of the first elastic body is higher than a second spring rate of the second elastic body.

7. The rack and pinion mechanism according claim 3, wherein a first spring rate of the first elastic body is higher than a second spring rate of the second elastic body.

8. The rack and pinion mechanism according claim 4, wherein a first spring rate of the first elastic body is higher than a second spring rate of the second elastic body.

* * * * *